(12) United States Patent
Pentony

(10) Patent No.: US 8,272,841 B2
(45) Date of Patent: Sep. 25, 2012

(54) PROPELLER BLADE RETENTION

(75) Inventor: Kevin Pentony, Gloucestershire (GB)

(73) Assignee: GE Aviation UK (GB)

(*) Notice: Subject to any disclaimer, the term of this patent is extended or adjusted under 35 U.S.C. 154(b) by 540 days.

(21) Appl. No.: 12/447,605

(22) PCT Filed: Nov. 1, 2007

(86) PCT No.: PCT/GB2007/004189
§ 371 (c)(1),
(2), (4) Date: Apr. 28, 2009

(87) PCT Pub. No.: WO2008/053230
PCT Pub. Date: May 8, 2008

(65) Prior Publication Data
US 2010/0104443 A1    Apr. 29, 2010

(30) Foreign Application Priority Data

Nov. 2, 2006 (GB) .................................. 0621834.1

(51) Int. Cl.
*B64C 11/04* (2006.01)
*B64C 11/26* (2006.01)
(52) U.S. Cl. ............ 416/219 A; 418/219 R; 418/220 R; 418/221; 418/220 A; 29/889.6; 29/889.7

(58) Field of Classification Search .................. None
See application file for complete search history.

(56) References Cited

U.S. PATENT DOCUMENTS

| | | | | |
|---|---|---|---|---|
| 2,762,502 A | * | 9/1956 | Lehman | .......... 206/335 |
| 3,487,879 A | | 1/1970 | McCarthy et al. | |
| 3,664,764 A | | 5/1972 | Duncan et al. | |
| 3,752,600 A | | 8/1973 | Walsh et al. | |
| 4,111,606 A | | 9/1978 | Prewo | |
| 6,773,234 B2 | * | 8/2004 | Sinha et al. | .......... 416/219 R |

FOREIGN PATENT DOCUMENTS

| | | |
|---|---|---|
| CN | 1497131 A | 5/2004 |
| DE | 4203205 A | 8/1993 |
| EP | 1484475 A | 12/2004 |
| GB | 1211082 A | 11/1970 |

OTHER PUBLICATIONS

PCT/GB2007/004189; International Search Report; International Filing Date Jan. 11, 2007.
Search Report & Written Opinion for corresponding GB0621834.1, Feb. 13, 2008.
Chinese Office Action for corresponding CN2007800407158, Aug. 4, 2010.

* cited by examiner

*Primary Examiner* — Hrayr A Sayadian
(74) *Attorney, Agent, or Firm* — Global Patent Operation

(57) ABSTRACT

A propeller blade assembly having mounting arrangements for composite aircraft propeller blades.

8 Claims, 2 Drawing Sheets

PROPELLER BLADE RETENTION

CROSS-REFERENCE TO RELATED APPLICATIONS

This is a national stage application under 35 U.S.C. §371 (c) of prior-filed, co-pending PCT patent application serial number GB07/04189, filed on Nov. 1, 2007, which claims priority to British patent application serial number 0621834.1 filed on Nov. 2, 2006, each of which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to arrangements and methods of retaining the inboard end of composite propeller blades in a hub, and is more particularly, but not exclusively, concerned with mounting arrangements for aircraft propeller blades of a composite construction.

2. Description of Related Art

Aircraft propellers comprise two or more blades mounted at their inboard end to a hub fixed with an engine shaft. Propellers having a variable pitch are arranged so that their pitch can be adjusted during use, or can be adjusted when stationary on the ground. In such propellers, the inboard or root ends of their blades have a circular cross-section so that they can be clamped (in the case of a ground-adjustable pitch) or retained in the hub in circular, rolling-element bearings (in the case of variable-pitch propellers) to allow for the blade pitch to be changed. Variable-pitch aircraft propellers are used to adjust the power absorption of the propeller from the driving engine by changing blade pitch, and some may also be "feathered" to produce little or no thrust and low drag, or produce reverse thrust for use on the ground, and have been in use almost since the advent of powered flight. Propeller blades have been manufactured in a variety of materials, but all variable pitch blade roots have a metal root end to interface with the retaining bearing. The metal blade root is either integral with the blade aerofoil if it is metal, or fixed to the blade aerofoil if it is not metal. The circular-section, metal root-end may also provide a circular dynamic sealing feature to contain any lubricating fluid within the hub as the blade pitch changes.

The cross-section of conventional composite aircraft propeller blades, and solid metal blades on variable-pitch propellers, changes gradually from an aerodynamic aerofoil shape to a circular or near-circular cross-section as the blades enter the blade root. This is referred to as the blade transition zone, and is necessary for structural reasons. It has the effect of increasing the aerodynamic drag of the inboard end of the blade, which is sometimes partially mitigated by moulding or otherwise attaching a non-structural fairing around the structure.

As well as producing and reacting the thrust loads of the propeller, propeller blades are subject to large centrifugal loads due to their rotation. They are also exposed to high-frequency vibration loads both from torque variations from the engine, especially if it is a direct-drive reciprocating piston engine, and from aerodynamic effects associated with airflow entering the plane of rotation of the propeller at an angle offset from the axis of rotation, known as "1P" loads. Blades have to endure these loads over a very large ambient temperature range encountered on the ground and in flight. The detachment of a propeller blade from a propeller during operation is a hazardous and potentially catastrophic occurrence, and accordingly the propeller blade and hub are classified as "critical parts" on aircraft. Therefore, when a propeller blade aerofoil is manufactured from a material other than the metal used for the blade root, the fixing of the one to the other is a critical design feature called upon to work in a difficult environment. Composite blades offer a significant weight reduction compared with metal blades, and many different means of fixing the composite blade safely to the metal root member are known.

BRIEF SUMMARY OF THE INVENTION

According to one aspect of the present invention there is provided a propeller blade assembly comprising a hub with a plurality of recesses and a plurality of propeller blades of composite construction having one end secured in retaining cavities in respective metal root members mounted within the hub recesses, the inboard end at least of each blade having a non-circular section comprising two fibre bundles on opposite sides of the blade and spaced from one another by a central region, the retaining cavities in the root member having a non-circular section and tapering from a relatively large cross-section at its inboard end to a relatively small cross-section at its outboard end adjacent the surface of the root member, the two fibre bundles being flared outwardly away from one another in the cavity and separated into at least two layers each, the assembly further including an insert member of a non-circular section located in each cavity between the two bundles in the central region, and a tapering, non-circular wedge member inserted between each layer of each bundle such that the inboard end of each blade is expanded outwardly on opposite sides of the insert member to fill the cavity and provide a mechanical retention against removal of the blades in an outboard direction.

Preferably, the cross-section of the inboard end of the blades and the insert member is rectangular. The wedge members are preferably bonded with the fibre layers by means of cured resin.

BRIEF DESCRIPTION OF THE DRAWINGS

An aircraft composite propeller blade assembly according to various aspects of the present invention, will now be described, by way of example, with reference to the accompanying drawings, in which.

DETAILED DESCRIPTION OF THE INVENTION

Figure 1:
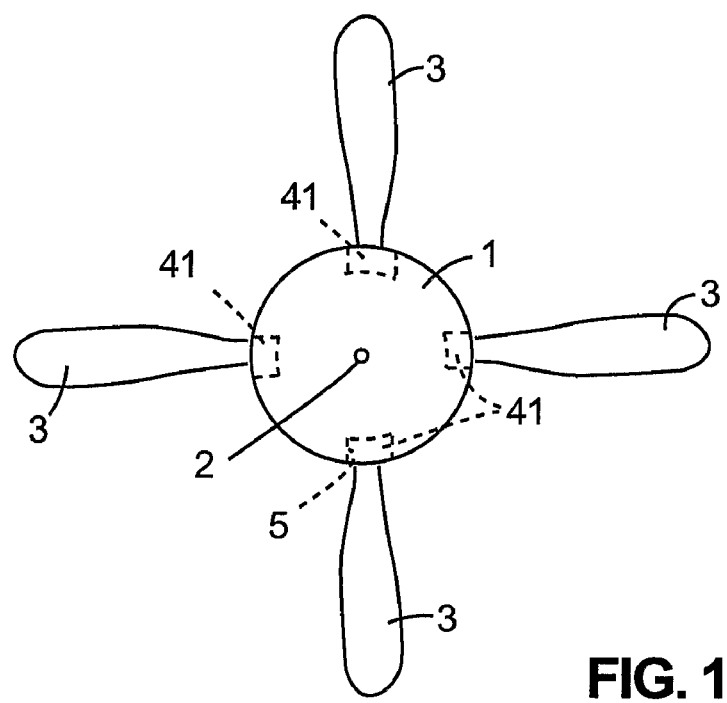
FIG. 1 is an end view of the assembly.

With reference first to FIGS. 1 to 4, the assembly comprises a central hub 1 rotated about its axis 2 and supporting four radially-extending blades 3. The aerofoil portion of each blade is of a composite material and the inboard end of each blade is secured within a metal root member 41 of generally cylindrical outer shape. The root members 41 are each mounted in a respective recess 5 in the hub 1. It will be appreciated that the assembly could have any number of two or more blades.

The blade aerofoil 3 are manufactured from carbon-fibre and glass-fibre reinforced epoxy resin with a central polyurethane foam core 33, which is a well-known method of construction. The reinforcing fibres are laid up in appropriately-shaped layers with the core 33 to pre-form the aerofoil shape, and may be pre-impregnated with resin, or the fibre may be "dry" and the resin injected into the blade structure at a later stage (resin-transfer moulding, or RTM). Although epoxy resin is the preferred matrix for the fibre reinforcement, other resin systems may be used. Similarly, the implementation of this invention is not exclusive to carbon and glass fibre construction, but can be used with other fibre types, nor does it depend on the inclusion of a separate core either of foam or any other material.

The blade aerofoil shape is formed by placing the fibre/core pre-form and the blade metal root into a mould with a cavity of the required blade shape, and applying heat and pressure to the mould while injecting resin into the cavity, in the case of RTM, or heat and pressure only in the case of pre-impregnated fibres.

The main structural feature of the blades 3 is a pair of spars 31 and 32 of rectangular section, each comprising mainly or exclusively a pack of several layers of continuous unidirectional fibre (usually carbon) with the fibre axis orientated parallel to the blade pitch-change axis. The spars 31 and 32 extend along opposite sides of the core 33, which is rectangular in section. The spars 31 and 32 need not necessarily have the same number of layers or thickness. The core 33 may be of any conventional construction, such as of a foam or a discrete composite bundle of bonded fibre layers. The two spars 31 and 32 extend beyond the inboard end 34 of the aerofoil blade 3 (that is, the location along the blade level with the external surface 35 of the metal blade root 41) as two approximately rectangular-section packs of continuous unidirectional fibre, each pack comprising several layers of fibre.

Figure 2:
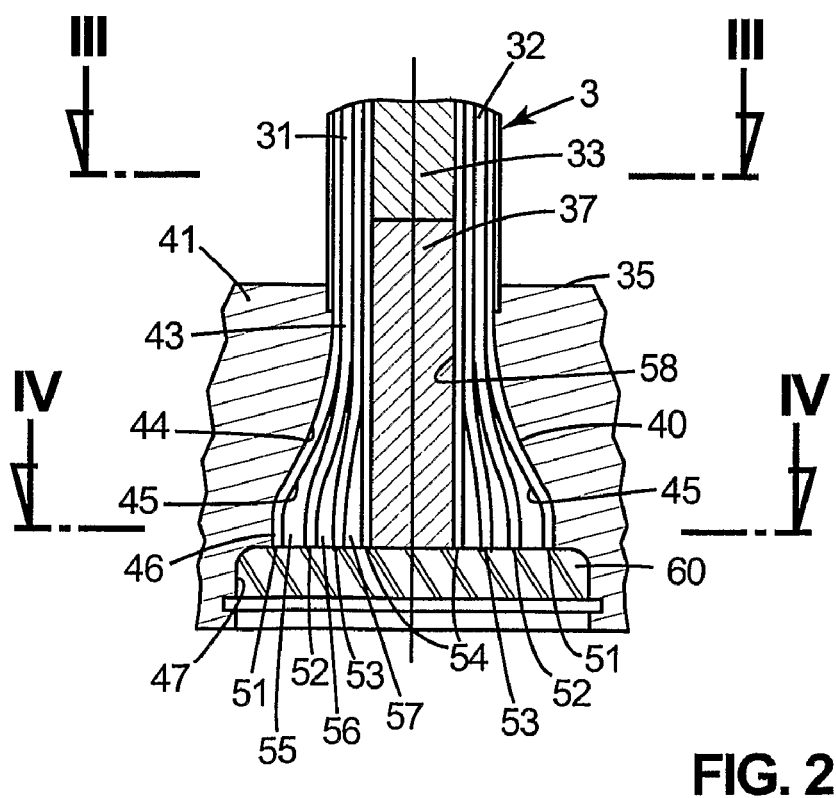
FIG. 2 is a cross-sectional side elevation view showing the inboard end of a blade and its retention in the hub.
Figure 3:
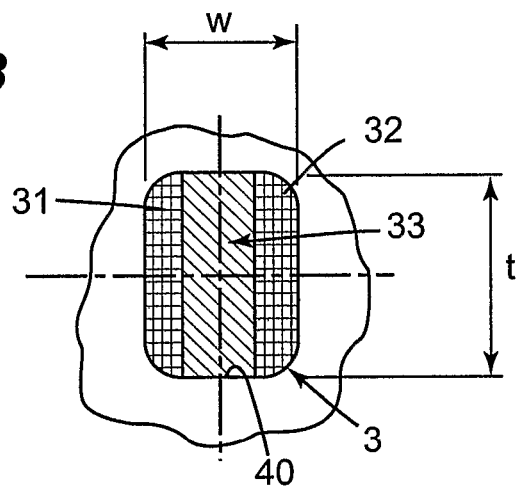
FIG. 3 is a sectional view along the line III-III of FIG. 2.

The core 33 of the blade 3 terminates in a part of the blade transition zone where it is of constant cross-section. This may be outboard of the external surface 35 of the metal root 41, as shown in FIG. 2, or it could be inboard, that is, inside the metal root.

Figure 4:
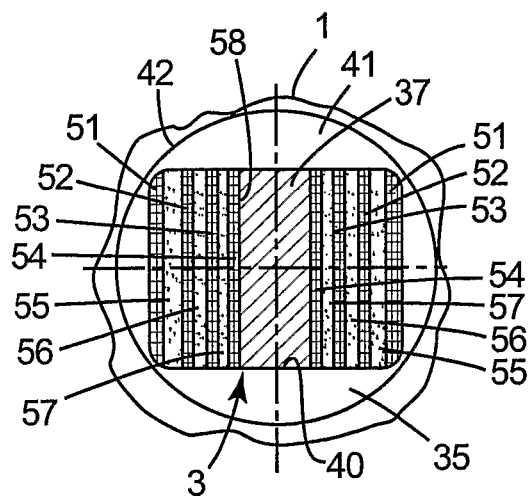
FIG. 4 is a sectional view along the line IV-IV of FIG. 2.

During the construction of the blade pre-form before moulding, two parallel extensions of the spars 31 and 32, inboard of the transition zone, are inserted into a shaped cavity 40 inside the metal blade root member 41 in the hub 1. In the case of fixed pitch propellers, the outside surface of the root member 41 may be non-circular, but for ground-adjustable and variable-pitch propellers the outside surface 42 is circular (as shown in FIG. 4). The axis of the root member 41 is co-axial with the central axis of the blade spars within the root, and is profiled to accommodate blade pitch-change and retention bearings and means for sealing the blade hub. The outboard and inboard surfaces of the blade root fitting 41 are perpendicular to the blade radial axis, and the inboard surface provides a mounting point for a blade pitch actuation feature (not shown).

The cavity 40 has a novel shape, which is symmetrical or nearly symmetrical about the plane formed by the centre of the spar packs 31 and 32. The outboard end of the cavity 40 has the same cross-section as the composite blade 3 where it emerges as a rectangular cross-section with rounded corners. This rounded-rectangular entry shape accommodates the spars 31 and 32 and any other fibre layers of the blade composite skin 43 that are to be drawn into the end-fitting 41. The cavity 40, viewed in plan, has a rectangular section with rounded corners throughout its depth. The thickness t of the cavity 40 is constant at different depths but its width w varies, being larger at its lower, inboard end than at the surface 35 of the root member 41. In the upper region 43 adjacent the surface 35 of the root member 41, the cavity 40 has a constant width w. The intermediate part 44 of the cavity 40, forming the major part of its length, flares outwardly gradually to increasing width away from the axis to form opposite curved, convex surfaces 45. The lower part 46 of the cavity 40 is relatively short and has a straight profile of constant width. Below this lower part 46 of the cavity is an enlarged stepped region 47. The inboard end of the blade 3 is received within the cavity 40 extending down to its lower region 46. The inboard end of the blade 3 is expanded laterally to closely fit within the cavity 40 so that its outer surfaces lie closely against the inside surfaces of the cavity.

The two blade spars 31 and 32 within the blade root cavity 40 are each divided into four approximately equal packs of fibre layers 51 to 54. The outermost spar fibre pack 51 is laid on the outside, curved profile of the root cavity 40. Then a first rectangular-planform, wedge-shaped fibre pre-form 55 is inserted between this pack 51 and the adjacent fibre pack 52. Then the second spar fibre pack 52 is laid over the first wedge 55. Then a second rectangular wedge pre-form 56 is inserted between the second fibre pack 52 and the third spar fibre pack 53. A third wedge 57 is finally inserted between the third and fourth fibre packs 53 and 54. This is repeated for both spars 31 and 32. The fibre wedges 55 to 57 comprise staggered layers of either dry fibres or fibres pre-impregnated with resin, whichever moulding system is employed for the blades 3. The wedges 55 to 57 are not pre-cured but are only cured when the blade 3 is moulded so that they become integral with the composite structure. The shape produced by the spars 31 and 32 and wedges 55 to 57 is such that a parallel-sided, rectangular-section void 58 is formed between the two wedged spars, centred on the blade root axis. The fibre volume proportion for the composite structure throughout the root is approximately ideal. The number of wedges used in each spar can be more or less than three, but three wedges have been determined to be the most efficient and effective.

A solid insert 37 of the same rectangular section and size as the blade core 33 is inserted centrally between the two blade spars 31 and 32 in the void 58 to abut the inboard end of the core 33 and to extend to the inboard end of the spars. The root insert 37 may be in one of many materials, metallic and non-metallic, and it is adhesively bonded in place after the blade has been moulded. The void 58 between the blade spars 31 and 32 to accommodate the insert 37 is formed by mould tooling of the same shape as the root insert, which is removed after moulding. This enables the composite wedge structure to be non-destructively inspected from within the moulded insert void 58 before the insert 37 is bonded in. A small clearance between the void 58 and the root insert 37 is provided to suit the adhesive system used to achieve maximum bond strength. The root insert 37 may provide other features required on propeller blades, such as accommodation for internal blade balance weights and attachment for blade pitch actuation items.

If the blades have no core, a sufficient thickness of composite in the centre of the pre-form is terminated near the outboard surface of the metal root to create a void between the two spars to receive the root insert.

Figure 5:
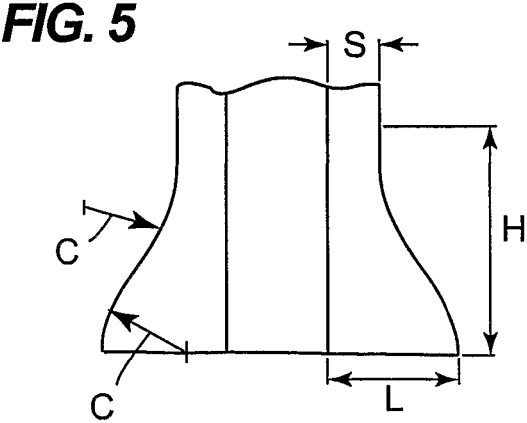
FIG. 5 is a simplified cross-sectional view of the inboard end of the blade.

The performance of the blade retention is maximised by appropriate selection of the spar thickness, wedge thickness, wedge height, and wedge curvature. Ideally, the wedge height-to-thickness ratio H/L and the spar thickness-to-wedge thickness ratio S/L (FIG. 5) should be in the range of two or three to one, but other ratios close to these may be satisfactory and may be necessitated by other design constraints. The wedge curvature C should be such as to blend tangentially into the blade spar 31, 32 and to the full width of the wedge such that the wedge ends just as it becomes parallel to the plane of the blade spar as illustrated in FIG. 5. Variations in profile are, however, possible provided a smooth blending is retained. The wedges are preferably shaped so as to maintain the ideal fibre volume fraction and avoid sudden changes in spar layer curvature. In this way the forces from the blade (propulsive thrust and centrifugal load) are transferred smoothly to the root member, stress raisers in the spar layers are avoided, and the load carrying strength of the composite blade retention system is optimised.

The final component of the retention arrangement is a plug 60 fitted inboard of the end of the composite blade 3 within the stepped, enlarged lower part 47 of the cavity 40 in the metal root member 41 symmetrical with the outside diameter. This lower part 47 of the cavity 40 is preferably machined after moulding and insert bonding. The plug 60 is not an essential component of the primary blade retention system, but performs useful secondary functions. The plug 60 is circular and is secured within the blade root metal fitting by any conventional means in a manner suitable for the performance of its main functions. The outboard surface of the plug 60 is fixed close to the inboard surface of the blade root insert such that if the insert becomes unbonded from the composite root wedge the plug will hold it in place against any forces that may be generated when the propeller is rotated. This provides a fail-safe feature if the insert bond were to fail. The circumference of the plug 60 may be used to accommodate a sealing feature, if necessary, to prevent any propeller hub lubricant from contaminating the composite blade from within. The plug 60 may be a removable component or may be a permanent part of the blade assembly, depending on maintainability requirements.

Adhesive bonds are highly dependant on manufacturing operator diligence and rigorous control of process parameters, and there are no fully-reliable non-destructive inspection methods for bonded joints. One advantage of the arrangement of the present invention is that the critical retention of the blade within the root member does not rely on adhesive bond integrity. In addition to the fail-safe retention of the insert 37 provided by the plug 60, the sides of the insert are parallel such that there are no inherent shear forces on the adhesive joint during operation that would tend to eject the insert if the adhesive were to fail. On the contrary, the normal centrifugal force on the insert 37 will tend to maintain its position within the composite blade root void 58. Similarly, the blade retention system does not depend on the adhesive bond that forms during moulding between the composite blade root and the cavity 40 in the metal root member 41. The composite blade 3 will still be safely retained in the event of total adhesive failure, and stress levels on the critical components will not be affected.

Conventional blade retention arrangements have previously used retaining wedges but in these conventional arrangements the composite material is circular in cross-section within the end-fitting, and the composite wedges are truncated, hollow conical shapes. The arrangement of the present invention can enable simpler wedge components to be used and allows for easier assembly. Also, it is possible to achieve a thinner, more aerodynamic aerofoil transition zone. This enables a reduced cost as well as an improved performance.

The arrangement of the present invention can avoid any need to thicken the blade in the transition zone, thereby minimising aerodynamic drag and obviating the need for an additional aerodynamic fairing. Blade loads are transferred mechanically to the metal end-fitting in a manner that minimises stresses in the metal and composite components by avoiding stress concentrations, and so maximises the strength capability of the retention system. The method of manufacture allows for the thorough non-destructive inspection of the composite structure inside the root member for moulding defects such as inclusions, voids and areas where the resin has not fully wetted the fibres, so ensuring that composite material properties are not compromised. Furthermore, the retention of composite blades within the metal root member does not depend on the bonding of the composite to the metal. Blade loads produce a wedging action that compresses the composite blade 3 in the metal root member 41 more firmly as loads increase. In particular, the bond between the metal insert 37 and the composite blade 3 is in a compressive load field due to the wedging action and there is no force generated that tends to shear the bond or eject the insert. The centrifugal force generated by the root insert itself tends to hold it in place even if the bond were to fail. Furthermore, the blade root plug 60 physically prevents the insert 37 from being displaced more than a minimal amount. The strength of the blade root composite material can be maximised by ensuring that composite fibre-volume fraction is maintained within requirements through the blade root wedge and the unidirectional fibres are not subject to crimping or sudden changes in direction that would reduce their load carrying capability. Assembly of the blade pre-form into the metal root member and installation of the simple, the flat wedges are simpler, quicker and more consistent than can be achieved with the equivalent cylindrical design.

It will be appreciated that the invention is not confined to use with aircraft propellers but could be used to retain other composite blades.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A propeller blade assembly, comprising:
    a hub having a plurality of recesses;
    a plurality of propeller blades of composite construction, each propeller blade comprising an inboard end and a metal root member having a retaining cavity,
        the inboard end being secured in the retaining cavity,
        each metal root member being mounted within one of the plurality of hub recesses,
        the inboard end of each propeller blade comprising a non-circular section comprising two fiber bundles on opposite sides of the blade and spaced from one another by a central region,
        the retaining cavity in the root member comprising a non-circular section and tapering from a cross-section at the retaining cavity inboard end to a relatively small cross-section at the retaining cavity outboard end, and
        the two fiber bundles being flared outwardly away from one another in the retaining cavity and separated into at least two layers each;
    an insert member comprising a non-circular section, at least a portion of the insert member being located in each retaining cavity between the two fiber bundles in the central region; and
    a tapering, non-circular wedge member inserted between each layer of each fiber bundle such that the inboard end of each propeller blade expands outwardly on opposite sides of the insert member, filling the retaining cavity and providing a mechanical retention against removal of the blades in an outboard direction.

2. The propeller blade assembly of claim 1, wherein the cross-section of the inboard end of the blades and the insert members is substantially rectangular.

3. The propeller blade assembly of claim 1, wherein the wedge members are bonded with the fiber layers by means of cured resin.

4. The propeller blade assembly of claim 1, wherein the cavity has a shape which is substantially symmetrical about a plane formed by the centre of spar packs comprising respective bundles.

5. The propeller blade assembly of claim 1, further comprising a low density core material provided between the fiber bundles.

6. The propeller blade assembly of claim 5, wherein the low density core material comprises polyurethane foam.

7. The propeller blade assembly of claim 1, wherein a wedge height-to-thickness ratio (H/L) and a fiber bundle thickness-to-wedge ratio (S/L) is in the range from about two or three to one.

8. The propeller blade assembly of claim 1, further comprising at least one plug fitted inboard of the end of a respective propeller blade within the cavity of a respective root member.

* * * * *